United States Patent [19]
Hoffman

[11] 3,735,605
[45] May 29, 1973

[54] COUPLING

[76] Inventor: John T. Hoffman, 1604 E. Greenleaf Street, Allentown, Pa. 18103

[22] Filed: Nov. 29, 1971

[21] Appl. No.: 202,819

[52] U.S. Cl...............................64/6, 64/9 R, 64/21, 64/31
[51] Int. Cl..............................................F16d 3/16
[58] Field of Search...................64/31, 6, 9 R, 9 A, 64/16, 21, 8

[56] References Cited

UNITED STATES PATENTS

| | | | |
|---|---|---|---|
| 2,286,182 | 6/1942 | Amberg | 64/21 |
| 1,635,565 | 7/1927 | Trunpler et al. | 64/6 |
| 2,038,466 | 4/1936 | Yates | 64/9 A |
| 2,599,329 | 6/1952 | Huntington | 64/31 |

*Primary Examiner*—Charles J. Myhre
*Assistant Examiner*—Randall Heald
*Attorney*—Fred Fisher

[57] ABSTRACT

A novel coupling permits a driving shaft to drive a driven shaft though the two shafts are not exactly coaligned. Each of a pair of housings has a keyed passageway for receiving its respected shaft. A double circumferentially grooved member rests within the passageways of the housings, one groove of the member being reposed within one of the housings, respectively. Each of three ball bearings is urged against one of the grooves of the member by a corresponding spring held by a corresponding set screw within one of the housings. Similarly, three ball bearings are urged against the other groove of the member by separate springs and set screws in the other housing. The outer diameter of the member is less than the inner diameter of the housings so that the member can rotate; however, the spring biased ball bearings assure that the housings cannot move axially with respect to each other.

Each housing has a plurality of pockets (e.g., four) for receiving corresponding ball bearings therewithin. The pockets are located at the central face of the housing. The ball bearings engage the pockets of the two housings. The ball bearings are larger than the pockets so that the driving housing drives the driven housing via the ball bearings. In essence, the member with its associated ball bearings restricts axial movement of the housings, while the ball bearings at the face of the housings enable the driving housing to drive the driven housing though the housings are not exactly coaligned.

7 Claims, 7 Drawing Figures

PATENTED MAY 29 1973 3,735,605
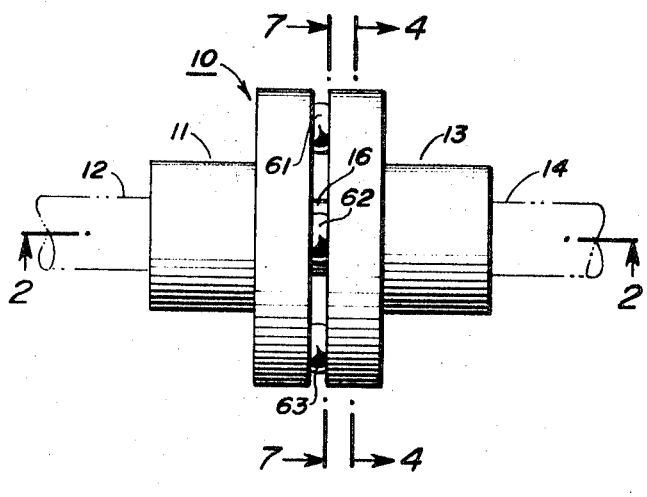
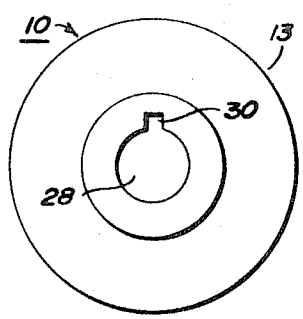
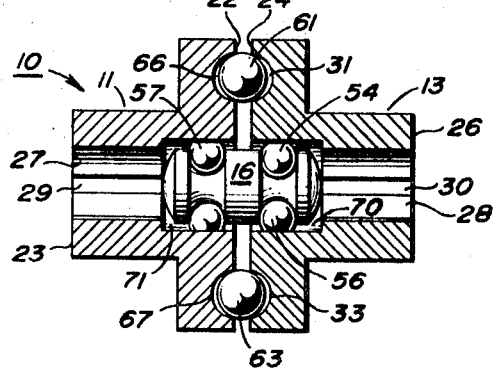
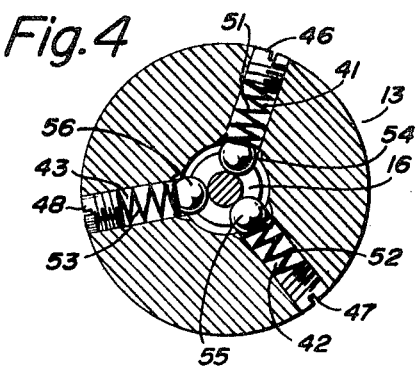
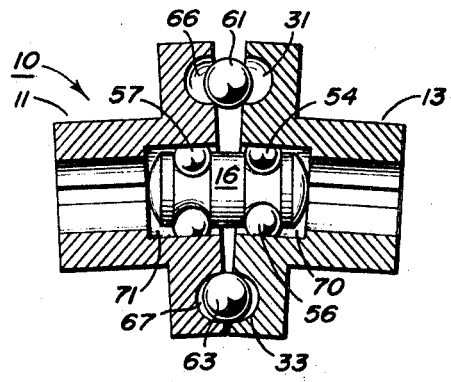
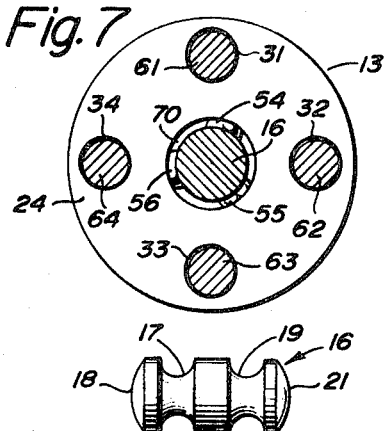
INVENTOR.
John T. Hoffman
BY
ATTORNEY

COUPLING

BACKGROUND OF THE INVENTION

1. Field of the Invention

This invention relates to couplings and, in particular, to novel couplings for permitting a driving shaft to drive a driven shaft though the two shafts are not exactly coaligned. Accordingly, the general objects of the invention are to provide new and improved couplings of such character.

2. Description of the Prior Art

During the course of a preliminary novelty search performed on behalf of the inventor, the following U.S. Pat. Nos. of interest were found:

| | | |
|---|---|---|
| 1,862,220 | Johnson | issued June 7, 1932 |
| 1,972,779 | Kradoska | issued Sept. 4, 1934 |
| 2,343,244 | Rose | issued Mar. 7, 1944 |
| 2,481,640 | Amberg | issued Sept. 13, 1949 |
| 2,599,329 | Huntington | issued June 3, 1952 |
| 3,381,498 | McDermott | issued May 7, 1968 |
| 3,453,842 | Rethwisch | issued July 8, 1969 |

Johnson U.S. Pat. 1,862,220, discloses a coupling wherein the recesses are of less depth than the ball bearing radius of the bearings therein for driving misaligned shafts. In Johnson, however, the coupling includes a driving element, a driven element rotatable eccentrically with respect to the driving element, a floating member disposed between the driving element and the driven element, and means connecting the elements with the floating member including rolling members moving in relatively eccentric circular paths in adjacent faces of the elements and members.

McDermott, U.S. Pat. 3,381,498, discloses an intermediate shaft with roller bearings circumferentially located near each end, and a center portion therebetween of less diameter than the bore containing it to allow movement for misalignment. McDermott is directed to a torque transmitting mechanism to provide for the transmitting of torque between a shaft member and a first rotatable member connected to one end of the shaft member, the other end of the shaft member being connected to a second rotatable member, one of the first and second members adapted for eccentric movement relative to the other of the members.

The remaining patents, set forth above, are of interest for their showings of variations of apparatus for driving nonaligned shafts.

SUMMARY OF THE INVENTION

Another object of this invention is to provide new and improved couplings for transmitting torque from a driving shaft to a driven shaft where the two shafts are not exactly coaligned.

It is a further object of this invention to provide new and improved couplings for permitting a driving shaft to drive a driven shaft though the two shafts are not exactly coaligned, wherein potential fatigue of the shafts adjacent to the coupling is substantially eliminated due to stresses normally caused by misalignment.

It is another object of this invention to provide new and improved couplings for permitting a driving shaft to drive a driven shaft, though the two shafts are not exactly coaligned, wherein the coupling cannot become inadvertently disengaged.

With these and other objects in mind, a coupling for permitting a driving shaft to drive a driven shaft, though the two shafts are not exactly coaligned, includes two housings for the shafts. The first housing for the driving shaft has a plurality of partial spherical pockets reposed about a face thereof in a predetermined configuration. The second housing for the driven shaft has a like plurality of partial spherical pockets reposed about a face thereof in a mirror image configuration with respect to the aforesaid predetermined configuration. A like plurality of ball bearings reside, at least partially, within the pockets. An elongated member has a pair of circumferential grooves disposed at opposite ends thereof, so that a first plurality of spring biased ball bearings can be urged against one of the grooves and a second plurality of spring biased ball bearings can be urged against the other groove. The first housing has means associated therewith for retaining the first plurality of ball bearings and for holding the member in nonaxial movement with respect thereto. Similarly, the second housing has means associated therewith for retaining the second plurality of ball bearings and for holding the member in a nonaxial movement with respect thereto. In a specific embodiment, the like plurality of ball bearings each has a radius greater than 40 percent but not exceeding 100 percent of the depth of the pockets.

In accordance with other features of the invention, a coupling for permitting a driving shaft to drive a driven shaft, though the two shafts are not exactly coaligned, includes a member of generally cylindrical shape having a first groove circumferentially disposed near one end thereof, and a second groove circumferentially disposed near the other end thereof. Ball bearings cooperate with the various grooves. Retaining means and springs are provided for the various ball bearings. A first housing, having an axial passageway from one end to an opposite end thereof, is adapted to receive a portion of the member wherein the member enters the passageway from one end of the housing. The passageway is adapted to receive a driving shaft from the opposite end thereof. The first housing has a substantially planar face at one end thereof, the face having a plurality of pockets with each of the pockets having a configuration adapted for cooperation with a number of ball bearings. The first housing further has a plurality of radial orifices extending through to and intercepting with the axial passageway, the orifices being adapted for engaging the retaining means, wherein one of the springs resides within one of the orifices, respectively, whereby, at each orifice, a spring, held therewithin by one of the retaining means, is urged against the ball bearing which in turn is urged against the first groove of the member. Similarly, a second housing is provided having an axial passageway from one end to an opposite end thereof, the passageway being adapted to receive a portion of the member wherein the member enters the passageway from one end of the housing, and the passageway is so adapted so as to receive a driven shaft from the opposite end of the housing. The second housing has a substantially planar face at one end thereof, the face having a plurality of pockets, corresponding in number to those in the face of the first housing, but in a mirror image relationship, the pockets having a configuration adapted for cooperation with the ball bearings. The second housing likewise has a plurality of radial orifices extending through to and intersecting with the axial passageway, the orifices being adapted for engaging the retaining means wherein one of a group of springs resides within each of the orifices, whereby at each orifice, one of the springs held by the retaining means is urged against a ball bearing, which in turn is urged against the second groove in the member. In a specific feature in the invention, each of the pockets has a depth greater than 40 percent but not exceeding 100 percent of the radius of one of the ball bearings held therewithin.

In accordance with a specific embodiment of the invention, a coupling for permitting a driving shaft to drive a driven shaft, though the two shafts are not exactly coaligned, includes a member of generally cylindrical shape having a first partially circular groove circumferentially disposed near one end thereof and a second partially circular groove circumferentially disposed near the other end thereof. A first plurality of ball bearings is provided for cooperation with the first partially circular groove. Similarly, a second plurality of ball bearings is provided for cooperation with the second partially circular groove. A third plurality of ball bearings is provided. A first plurality and a second plurality of set screws equal in number to the first plurality and the second plurality of ball bearings, respectively, is provided. A pair of housings, each having a generally cylindrical configuration with a T-shaped cross section, are provided wherein one end of each of the housings has a relatively large diameter and the opposite end of each of the housings has a relatively smaller diameter. Each housing has an axial passageway from one end to the opposite end thereof. Each passageway is adapted to receive a portion of the member, wherein the member enters the passageway from one end of the housing. The passageways are so keyed as to receive a mating keyed driving shaft and driven shaft, respectively, from the opposite end of the respective housing. Each housing has a substantially planar face at the relatively large one end thereof. The face has a plurality of pockets, corresponding in number to the third plurality, equiangularly disposed about a circle concentric with the axis of its passageway. The circles for the two housings are identical. The pockets have a configuration adapted for cooperation with the third plurality of ball bearings. Each of the pockets has a depth greater than 40 percent but not exceeding 100 percent of the radius of one of the third plurality of ball bearings. Each housing has a plurality of equiangularly disposed radial orifices which are equal in number to the first and second plurality of ball bearings, respectively. The orifices extend from the external circumferential surface at the large diameter portion through to and intersecting with the respective axial passageway. The orifices are threaded, at least in part, for engaging the first and second plurality, respectively, of set screws, wherein one of the first plurality and second plurality, respectively, of springs resides within each of the orifices, whereby, at each orifice, one of the first and second plurality, respectively, of set screws is held in place therein and one of the first and second plurality, respectively, of springs therewithin is urged against one of the first and second plurality, respectively, of ball bearings, which, in turn, is urged against the first and second, respectively, partially circular groove of the member.

BRIEF DESCRIPTION OF THE DRAWINGS

Other objects, advantages, and aspects of the invention will become apparent by reference to the following detailed description and drawings of a specific embodiment thereof, wherein:

FIG. 1 is a front view of a coupling, in accordance with one embodiment of this invention, for receiving driving and driven shafts (shown in dotted outline);

FIG. 2 is a sectional view taken along the line 2—2 of FIG. 1;

FIG. 3 is a side view thereof;

FIG. 4 is a sectional view taken along the line 4—4 of FIG. 1;

FIG. 5 is a view similar to that of FIG. 2 but with the shafts misaligned;

FIG. 6 is a plan view of a double circumferentially grooved member used within the coupling illustrated in FIGS. 1–5; and FIG. 7 is a sectional view taken along the line 7—7 of FIG. 1.

DETAILED DESCRIPTION

Referring to the drawing, especially FIG. 1, there is shown a coupling 10 including a first housing 11 for retaining a driving shaft 12 (shown in dotted outline) and a second housing 13 for holding a driven shaft 14 (as shown in dotted outline).

The coupling 10 includes a member 16, best shown in FIG. 6, of generally cylindrical shape having a first partially circular groove 17 circumferentially disposed near one end 18 thereof and a second partially circular groove 19 circumferentially disposed near the opposite end 21 thereof.

Both housings 11 and 13, generally cylindrical in shape, have a T-shaped cross-section, as best shown in FIG. 2. The housing 11 has a relatively large diameter at one end 22 thereof and a relatively short or reduced diameter at the opposite end 23 thereof. The housing 13, in similar fashion, has a correspondingly large diameter at the end 24 with a corresponding short diameter at the end 26 thereof.

Both the housings 11 and 13 are formed with axial passageways 27 and 28, respectively, therein. The passageways 27 and 28 are formed with keyed portions 29 and 30 to key the respective shafts 12 and 14 therein.

The end 22 of the housing 11 is formed with a substantially planar face perpendicular to the passageway 27. In like manner, the end 24 of the housing 13 is formed with a planar face perpendicular to the passageway 28.

As best shown in FIG. 7, the planar face 24 is formed with a plurality of recesses 31, 32, 33 and 34 about an imaginary circle concentric with the axis of the housing 13. In similar fashion, the housing 11 has its face 22 so formed with pockets.

Each of the housings 11 and 13 includes a plurality of radially directed apertures (see especially FIG. 4). The radially directed apertures for the housing 13 may include, for example, three apertures 41, 42, 43 equiangularly spaced near the large planar surface 24 of the housing 13. Within each aperture 41, 42, 43 is a corresponding set screw 46, 47, 48, respectively, which is held in place within a corresponding screw threading within the respective apertures 41, 42, 43. The set screws 46, 47, 48 are urged against the springs 51, 52, 53, respectively, which are housed in the apertures 41, 42, 43. The springs 51, 52, 53 are urged against corresponding ball bearings 54, 55, 56, respectively.

The three ball bearings 54, 55, 56 which are spring biased by the set screw spring combinations 46-51, 47-52, 48-53 are urged against the partially circular groove 19 of the member 16, as depicted in FIGS. 2 and 4.

Similarly, corresponding set screws and springs urge corresponding ball bearings (including bearing 57 depicted in FIGS. 2 and 5) against the partially circular groove 17 of the member 16, as depicted in FIGS. 2 and 5.

A plurality of ball bearings 61, 62, 63, 64 engage the respective pockets 31, 32, 33, 34 of the housing 13 and further engage the corresponding pockets in the housing 11.

The pockets 31, 32, 33, 34 of the housing 13 and the corresponding pockets 66, 67 (and two others not shown in FIGS. 2 and 5) of the housing 11 are of such depth as to range from 40 percent to 100 percent of the radius of the corresponding ball bearings 61, 62, 63, 64.

In operation, the ball bearings 54, 55, 56, urged against the groove 19 of the member 16, together with the corresponding ball bearings 57 which are urged against the corresponding groove 17 of the member 16, restrain the axial movement of the driven shaft 14 with respect to that of the driving shaft 12.

The ball bearings 61, 62, 63, 64 which are housed between the corresponding pockets of the housings 11 and 13 provide a medium for driving the driven shaft 14 by the driving shaft 12.

Thus, the ball bearings 61, 62, 63, 64, preferably, equally spaced in the pockets, are permitted to move axially when the driving shaft and the driven shaft are out of alignment. These bearings 61–64 act as a driving contact between the housings 11 and 13. These ball bearings 61–64 may be of the same size or different size than the internal ball bearings 54, 55, 56, 57.

As shown in FIG. 2, preferably the driving housing 11 should be coaligned with the driven housing 13 in which case the transmission of torque is along a common axis. However, as depicted in FIG. 5, when the axes of the housings 11 and 13 are non-aligned, rotational movement can be imparted to the driven shaft 14 by the driving shaft 12 via the ball bearings 61–64.

In a specific embodiment of the invention, a working limit of 1° 30' of misalignment is acceptable.

The spring loaded ball bearings 54, 55, 56, and 57 are equally spaced within their corresponding spherical grooves 19 and 17, respectively, of the member 16. In a specific embodiment, the apertures 41, 42, and 43 can be 10 larger than the ball bearing 54–57 diameters.

In one form, the member 16 can have flat planar ends 18 and 21. However, as shown in FIG. 6, the ends 18 and 21 are curved so as to allow, in one embodiment, 2° floating action of the member 16 between the ends of the driving shaft 12 and the driven shaft 14. The diameter of the member 16 is smaller than the bore 70 and 71 so as to permit the member 16 to float therewithin.

Various modifications can be performed without departing from the spirit and scope of this invention, for example, the shafts, in lieu of being keyed within the housings 11 and 13, respectively, may be held therewithin by other suitable connections well known to those skilled in the art. In a similar vein, the ball bearing 61–64 may be oriented along other than a common concentric circle in an equiangularly spaced configuration as depicted in FIG. 7; other embodiments may be utilized. However, the concentric circle and equal spacing are preferred in order to have a properly balanced system.

I claim:

1. A coupling for permitting a driving shaft to drive a driven shaft though the two shafts are not exactly coaligned, comprising
   a. a first housing for said driving shaft having a plurality of partial spherical pockets reposed about a face thereof in a predetermined configuration;
   b. a second housing for said driven shaft having a like plurality of partial spherical pockets reposed about a face thereof in a mirror image configuration with respect to said predetermined configuration;
   c. a like plurality of ball bearings, each for residing, at least partially, within a corresponding one of said pockets;
   d. an elongated member having a pair of circumferential grooves disposed at opposite ends of said member;
   e. a first plurality of spring biased ball bearings for urging against one of said grooves;
   f. a second plurality of spring biased ball bearings for urging against the other of said grooves;
   g. means associated with said first housing for retaining said first plurality of ball bearings and for holding said member for non-axial movement with respect to said first housing; and
   h. means associated with said second housing for retaining said second plurality of ball bearings and for holding said member for non-axial movement with respect to said second housing.

2. The coupling as recited in claim 1 wherein said like plurality of ball bearings each has a redius greater than 40 percent but not exceeding 100 percent of the depth of said pockets.

3. A coupling for permitting a driving shaft to drive a driven shaft though the two shafts are not exactly coaligned, comprising
   a. a member of generally cylindrical shape having a first groove circumferentially disposed near one end thereof and a second groove circumferentially disposed near the other end thereof;
   b. a first plurality of ball bearings adapted for cooperation with said first groove;
   c. a second plurality of ball bearings adapted for cooperation with said second groove;
   d. a third plurality of ball bearings;
   e. a first plurality of retaining means, equal in number to said first plurality of ball bearings;
   f. a second plurality of retaining means, equal in number to said second plurality of ball bearings;
   g. a first plurality of springs, equal in number to said first plurality of ball bearings;
   h. a second plurality of springs, equal in number to said second plurality of ball bearings;
   i. a first housing
      1. having an axial passageway from one end to an opposite end thereof, said passageway being adapted to receive a portion of said member wherein said member enters said passageway from said one end of said first housing, and said passageway being adapted to as to receive a driving shaft from said opposite end of said first housing;

2. having a substantially planar face at the said one end of said first housing, said face having a plurality of pockets, corresponding in number to said third plurality, said pockets having a configuration adapted for cooperation with said third plurality of ball bearings;

3. having a plurality of radial orifices, and equal in number to said first plurality of ball bearings, extending through to and intersecting with said axial passageway, said orifices being adapted for engaging said first plurality of retaining means, wherein one of said first plurality of springs resides within each of said orifices, whereby, at each orifice, one of said first plurality of springs therewithin, held by one of said retaining means, is urged against one of said first plurality of ball bearings, which, in turn, is urged against said first groove of said member; and j. a second housing 1. having an axial passageway from one end to an opposite end thereof, said passageway being adapted to receive a portion of said member wherein said member enters said passageway from said one end of said second housing, and said passageway being adapted so as to receive a driven shaft from said opposite end of said second housing;

2. having a substantially planar face at the said one end of said second housing, said face having a plurality of pockets. corresponding in number to said third plurality, disposed in a mirror image configuration to those pockets on said first housing face, said pockets having a configuration adapted for cooperation with said third plurality of ball bearings;

3. having a plurality of radial orifices, and equal in number to said second plurality of ball bearimgs, extending through to and intersecting with said axial passageway, said orifices being adapted for engaging said second plurality of retaining means wherein one of said second plurality of springs resides within each of said orifices, whereby, at each orifice, one of said second plurality of springs therewithin, held by one of said retaining means, is urged against one of said second plurality of ball bearings, which, in turn, is urged against said second groove of said member.

4. The coupling as recited in claim 3 wherein each of said pockets has a depth greater than 40 percent, but not exceeding 100 percent of the radius of one of said third plurality of ball bearings.

5. The coupling as recited in claim 3 wherein each of said first and said second plurality of ball bearings is three.

6. A coupling for permitting a driving shaft to drive a driven shaft though the two shafts are not exactly coaligned, comprising a. a member of generally cylindrical shape having a first partially circular groove circumferentially disposed near one end thereof and a second partially circular groove circumferentially disposed near the other end thereof;

b. a first plurality of ball bearings adapted for cooperation with said first partially circular groove;

c. a second plurality of ball bearings adapted for cooperation with said second partially circular groove;

d. a third plurality of ball bearings;

e. a first plurality of set screws, equal in number to said first plurality of ball bearings;

f. a second p.urality of set screws, equal in number to said second plurality of ball bearings;

g. a first plurality of springs, equal in number to said first plurality of ball bearings;

h. a second plurality of springs, equal in number to said second plurality of ball bearings;

i. a first housing having a generally cylindrical configuration with a T-shaped cross-section, wherein one end of said first housing has a relatively large diameter and the opposite end of the said first housing has a relatively smaller diameter, said first housing 1. having an axial passageway from said one end to said opposite end thereof, said passageway being adapted to receive a portion of said member wherein said member enters said passageway from said one end of said first housing, and said passageway being keyed so as to receive a mating keyed driving shaft from said opposite end of said first housing;

2. having a substantially planar face at the said relatively large one end of said first housing, said face having a plurality of pockets, correwponding in number to said third plurality, equiangularly disposed about a circle concentric with the axis of said passageway, said pockets having a configuration adapted for cooperation with said third plurality of ball bearings, each of said pockets having a depth greater than 40 percent, but not exceeding 100 percent, of the radius of one of said third plurality of ball bearings;

3. having a plurality of equiangularly disposed radial orifices, and equal in number to said first plurality of ball bearings, extending from the external circumferential surface at the large diameter portion through to and intersecting with said axial passageway, said orifices being threaded, at least in part, for engaging said first plurality of set screws, wherein one of said first plurality of springs resides within each of said orifices, whereby, at each orifice, one of said first plurality of set screws is held in place therein, and one of said first plurality of springs therewithin is urged against one of said first plurality of ball bearings, which, in turn, is urged against said first partially circular groove of said member; and j. a second housing having a generally cylindrical configuration with a T-shaped cross-section, wherein one end of said second housing has a relatively large diameter and the opposite end of said second housing has a relatively smaller diameter, said second housing 1. having an axial passageway from said one end to said opposite end thereof, said passageway being adapted to receive a portion of said member wherein said member enters said passageway from said one end of said second housing, and said passageway being keyed so as to receive a mating keyed driven shaft from said opposite end of said second housing;

2. having a substantially planar face at the said relatively large one end of said second housing, said face having a plurality of pockets, corresponding in number to said third plurality, equiangularly disposed about a circle, corresponding to the aforesaid circle, concentric with the axis of said passageway, said pockets having a configuration adapted for cooperation with said third plurality of ball bearings, each of said pockets having a depth greater than 40 percent, but not exceeding 100 percent of the radius of one of said third plurality of ball bearings;

3. having a plurality of equiangularly disposed radial orifices, and equal in number to said second plurality of ball bearings, extending from the external circumferential surface at the large diameter portion through to and intersecting with said axial passageway, said orifices being threaded, at least in part, for engaging said second plurality of set screws, wherein one of said second plurality of springs resides within each of said orifices, whereby, at each orifice, one of said second plurality of set screws is held in place therein, and one of said second plurality of springs therewithin is urged against one of said second plurality of ball bearings, which, in turn, is urged against said second partially circular groove of said member.

7. The coupling as recited in claim 6 wherein each of said first and said second plurality of ball bearings is three.

* * * * *